(12) United States Patent
Cai et al.

(10) Patent No.: US 12,609,602 B2
(45) Date of Patent: Apr. 21, 2026

(54) SINGLE-INDUCTOR BIPOLAR-OUTPUT CONVERTER

(71) Applicants:National Cheng Kung University, Tainan City (TW); Himax Technologies Limited, Tainan City (TW)

(72) Inventors: Meng-Xun Cai, Tainan City (TW); Chien-Hung Tsai, Tainan City (TW)

(73) Assignees: National Cheng Kung University, Tainan City (TW); Himax Technologies Limited, Tainan City (TW)

( * ) Notice: Subject to any disclaimer, the term of this patent is extended or adjusted under 35 U.S.C. 154(b) by 231 days.

(21) Appl. No.: 18/531,533

(22) Filed: Dec. 6, 2023

(65) Prior Publication Data

US 2025/0192675 A1 Jun. 12, 2025

(51) Int. Cl.
*H02M 1/00* (2007.01)
*H02M 3/158* (2006.01)

(52) U.S. Cl.
CPC ......... *H02M 1/009* (2021.05); *H02M 1/0025* (2021.05); *H02M 3/158* (2013.01)

(58) Field of Classification Search
CPC ... H02M 1/009; H05B 45/37; H05B 45/3725; H05B 45/37375; H05B 45/38; H05B 45/382
See application file for complete search history.

(56) References Cited

U.S. PATENT DOCUMENTS

| | | | | |
|---|---|---|---|---|
| 6,949,915 | B2* | 9/2005 | Stanley | H02M 1/4208 |
| | | | | 363/127 |
| 7,852,056 | B2* | 12/2010 | Nishida | H02M 3/157 |
| | | | | 323/282 |
| 8,614,569 | B2* | 12/2013 | Premont | H02M 3/158 |
| | | | | 363/69 |
| 9,602,001 | B1* | 3/2017 | Hung | H02M 3/158 |
| 2004/0027104 | A1* | 2/2004 | Ishii | H02M 3/1582 |
| | | | | 323/267 |
| 2011/0089917 | A1* | 4/2011 | Chen | H02M 3/1584 |
| | | | | 323/282 |
| 2011/0169468 | A1* | 7/2011 | Wu | H02M 3/157 |
| | | | | 323/282 |
| 2012/0187932 | A1* | 7/2012 | Singnurkar | H02M 3/158 |
| | | | | 323/282 |
| 2014/0084889 | A1* | 3/2014 | Kuroiwa | H02M 3/158 |
| | | | | 323/283 |

(Continued)

FOREIGN PATENT DOCUMENTS

TW I644300 B * 12/2018

*Primary Examiner* — Gustavo A Rosario-Benitez
(74) *Attorney, Agent, or Firm* — Donald E. Stout; Stout, Uxa & Buyan, LLP

(57) ABSTRACT

A single-inductor bipolar-output converter includes a power stage that generates a positive output voltage and a negative output voltage; a first error amplifier that generates a first error signal according to the positive output voltage; a second error amplifier that generates a second error signal according to the negative output voltage; a summation device that generates a sum signal by adding the first error signal and the second error signal; and a tunable gain control circuit coupled to receive the first error signal and configured to generate an amplified first error signal with a tunable gain.

14 Claims, 4 Drawing Sheets

(56)  References Cited

U.S. PATENT DOCUMENTS

2017/0023959 A1*   1/2017  Chen ..................... H02M 3/158
2017/0324323 A1*  11/2017  Liu ........................ H02M 1/08
2020/0076299 A1*   3/2020  Xue ..................... H02M 3/158
2022/0416661 A1*  12/2022  Cheng ................ H02M 3/1582

* cited by examiner

100

SINGLE-INDUCTOR BIPOLAR-OUTPUT CONVERTER

BACKGROUND OF THE INVENTION

1. Field of the Invention

The present invention generally relates to a single-inductor bipolar-output (SIBO) converter, and more particularly to a SIBO converter with tunable power distribution control.

2. Description of Related Art

As modern electronic products become thinner, lighter and smaller, chip size reduction has become an inevitable challenge. Traditionally, the switching inductor DC-DC converter is used as the power supply solution for the power converter. However, each converter needs to use an independent inductor, which certainly increases the cost and area in practical applications.

The emergence of the single-inductor multiple-output (SIMO) architecture requires only one inductor, as an external component, to generate multiple sets of output voltages. However, this architecture creates the problem of interactive voltage regulation. In active-matrix organic light-emitting diode (AMOLED) applications, for example, we need both positive and negative supply voltages. In order to save external components, we use topology of single-inductor bipolar-output (SIBO), a type of SIMO architecture, to provide the required bipolar voltage supply.

Active-energy-correction (AEC) technique has been proposed to improve the interactive voltage regulation phenomenon caused by a single load change. However, in some applications, such as AMOLED, the load currents usually vary simultaneously (or synchronously) and in the same way (commonly called synchronous load transient), which make the cross-regulation problem in the converter even more serious.

For the reason that conventional SIBO converter could not effectively solve the cross-regulation problem, a need has arisen to propose a novel scheme to overcome the drawbacks of the conventional converters.

SUMMARY OF THE INVENTION

In view of the foregoing, it is an object of the embodiment of the present invention to provide a single-inductor bipolar-output (SIBO) converter capable of alleviating the suffering on the output voltages when the load currents change simultaneously and in the same way, and uneven distribution of positive and negative (voltage) energy.

According to one embodiment, a single-inductor bipolar-output converter includes a power stage, a first error amplifier, a second error amplifier, a summation device and a tunable gain control circuit. The power stage generates a positive output voltage and a negative output voltage. The first error amplifier generates a first error signal according to the positive output voltage, and the second error amplifier generates a second error signal according to the negative output voltage. The summation device generates a sum signal by adding the first error signal and the second error signal. The tunable gain control circuit is coupled to receive the first error signal and is configured to generate an amplified first error signal with a tunable gain.

DETAILED DESCRIPTION OF THE INVENTION

Figure 1:
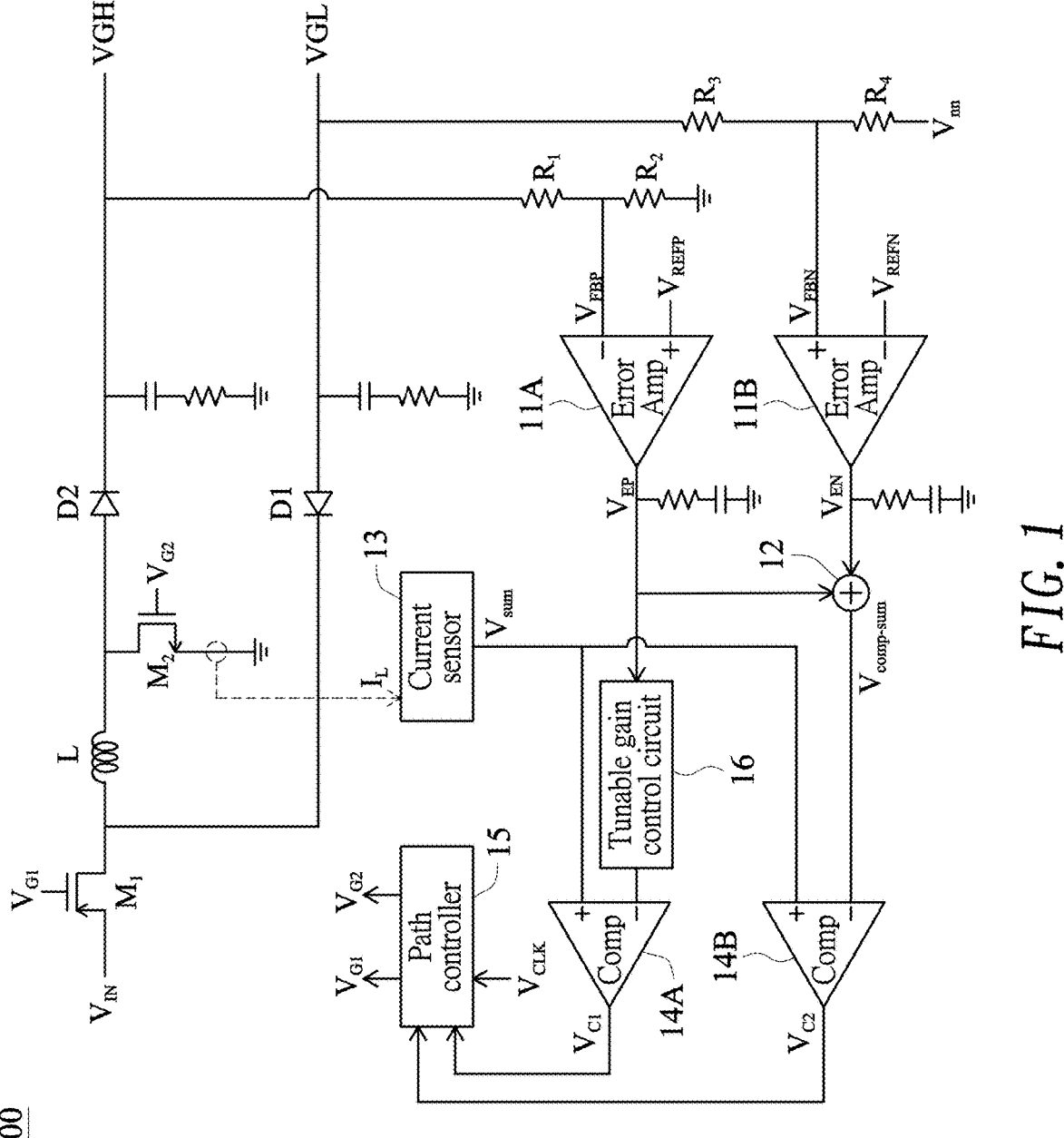
FIG. 1 shows a circuit diagram illustrating a single-inductor bipolar-output (SIBO) converter according to one embodiment of the present invention.
Figure 2:
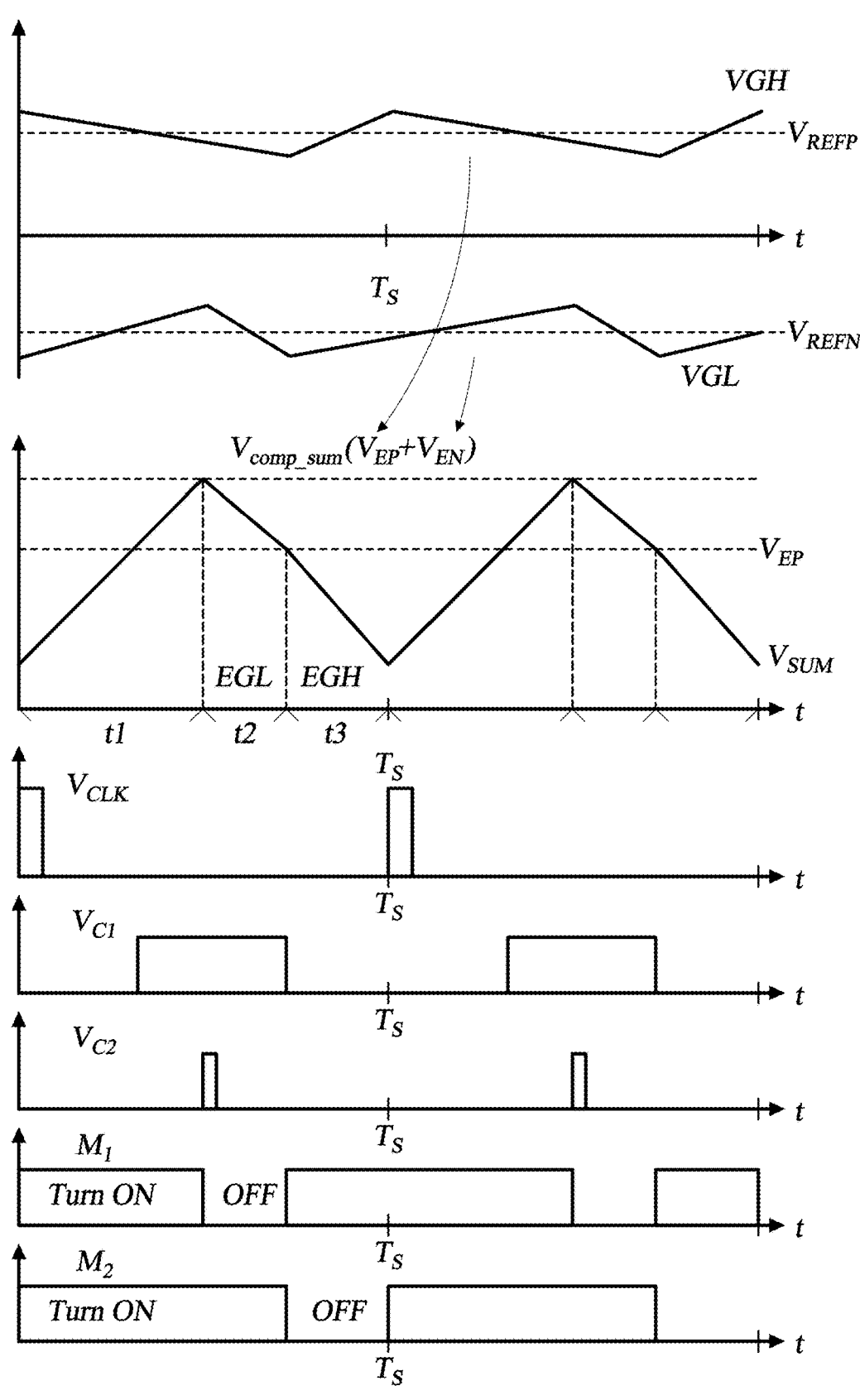
FIG. 2 shows waveforms of pertinent signals of the SIBO converter of FIG. 1.

FIG. 1 shows a circuit diagram illustrating a single-inductor bipolar-output (SIBO) converter 100 according to one embodiment of the present invention, and FIG. 2 shows waveforms of pertinent signals of the SIBO converter 100 of FIG. 1.

In the embodiment, the SIBO converter (converter hereinafter) 100 may include a (single) inductor L. The converter 100 may include a first switch $M_1$ controlled by a first switch signal $V_{G1}$ and coupled between an input voltage $V_{IN}$ and (a first end of) the inductor L. In one exemplary embodiment, the first switch $M_1$ may include a p-type metal-oxide-semiconductor field-effect (MOSFET) transistor with a source coupled to receive the input voltage $V_{IN}$, a drain connected to the first end of the inductor L and a gate coupled to receive the first switch signal $V_{G1}$.

The converter 100 of the embodiment may include a second switch $M_2$ controlled by a second switch signal $V_{G2}$ and coupled between (a second end of) the inductor L and ground. In one exemplary embodiment, the second switch $M_2$ may include an n-type MOSFET transistor with a source connected to the ground, a drain connected to the second end of the inductor L and a gate coupled to receive the second switch signal $V_{G2}$.

The converter 100 of the embodiment may include a first diode D1 with a cathode electrode connected to the first end of the inductor L and an anode electrode at which a negative output voltage VGL is outputted. The converter 100 of the embodiment may include a second diode D2 with an anode electrode connected to the second end of the inductor L and a cathode electrode at which a positive output voltage VGH is outputted. It is noted that the inductor L, the first switch $M_1$, the second switch $M_2$, the first diode D1 and the second diode D2 constitute a power stage of the converter 100, and the rest of the converter 100 constitutes a control stage of the converter 100.

The converter 100 may include a first error amplifier (error amp) 11A configured to generate a first error signal $V_{EP}$ according to the positive output voltage VGH, a second error amplifier 11B configured to generate a second error signal $V_{EN}$ according to the negative output voltage $V_{GL}$, and a summation device 12 configured to generate a sum signal $V_{comp\_sum}$ (indicating required total energy) by adding the first error signal $V_{EP}$ and the second error signal $V_{EN}$.

Specifically, in the embodiment, the first error amplifier 11A amplifies a difference between a (predetermined) first reference voltage $V_{REFP}$ (connected to a non-inverting input node) and a first divided voltage $V_{FBP}$ (connected to an inverting input node) that is a fraction of the positive output voltage VGH by a (first) voltage divider composed of a first resistor $R_1$ and a second resistor $R_2$ connected in series (between the positive output voltage VGH and the ground). The second error amplifier 11B amplifies a difference between a (predetermined) second reference voltage $V_{REFN}$ (connected to an inverting input node) and a second divided voltage $V_{FBN}$ (connected to a non-inverting input node) that is a fraction of the negative output voltage VGL by a (second) voltage divider composed of a third resistor $R_3$ and a fourth resistor $R_4$ connected in series (between the negative output voltage VGL and a predetermined voltage $V_{nn}$).

The converter 100 may include a current sensor 13 configured to generate an inductor signal $V_{SUM}$ representing an inductor current $I_L$ flowing through the inductor L and slope data of the inductor current $I_L$ with respect to time change.

The converter 100 may include a first comparator (comp) 14A that compares the inductor signal $V_{SUM}$ and the first error signal $V_{EP}$, and outputs a first compare signal $V_{C1}$ indicating whether the inductor signal $V_{SUM}$ is larger than the first error signal $V_{EP}$. The converter 100 may include a second comparator 14B that compares the inductor signal $V_{SUM}$ and the sum signal $V_{comp\_sum}$, and outputs a second compare signal $V_{C2}$ indicating whether the inductor signal $V_{SUM}$ is larger than the sum signal $V_{comp\_sum}$.

The converter 100 may include a path controller 15 (controlled by a clock signal $V_{CLK}$) configured to determine one of a plurality of paths (three paths in the embodiment) and accordingly generate the first switch signal $V_{G1}$ and the second switch signal $V_{G2}$.

Figure 3A:
FIG. 3A shows a circuit diagram illustrating a portion of the converter of FIG. 1 and the determined paths.
Figure 3A:
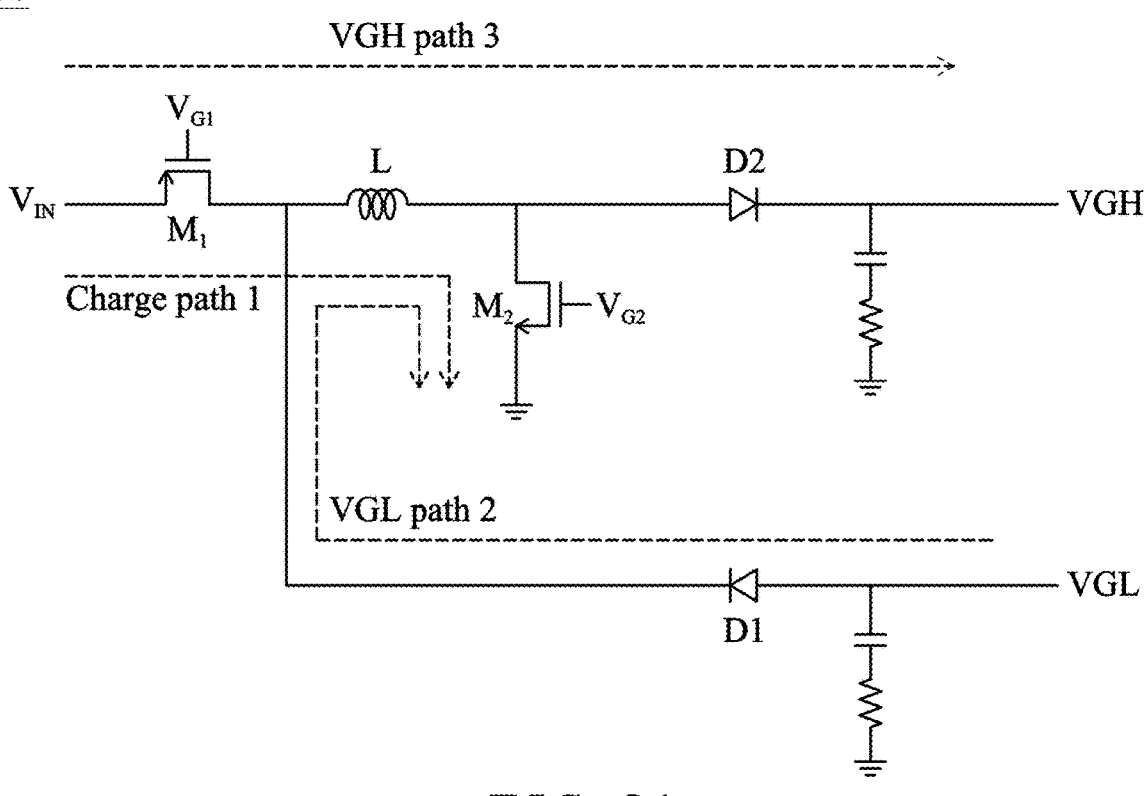
Figure 3B:
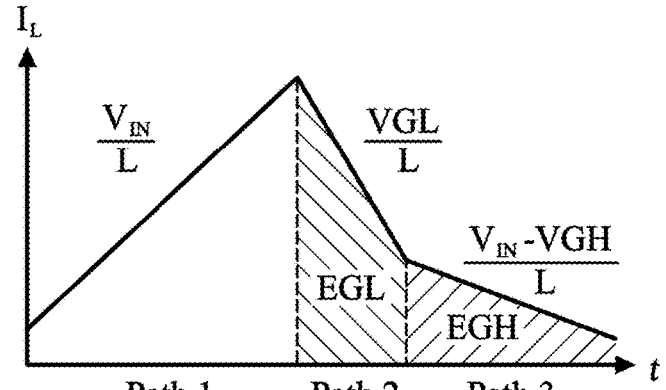
FIG. 3B shows a waveform illustrating the inductor current, associated slop data and power distribution sequence in the converter of FIG. 1.

FIG. 3A shows a circuit diagram illustrating a portion of the converter 100 of FIG. 1 and the determined paths, and FIG. 3B shows a waveform illustrating the inductor current $I_L$, associated slop data and power distribution sequence in the converter 100 of FIG. 1.

At the beginning of each switching cycle (i.e., the period of the clock signal $V_{CLK}$), the inductor L begins to charge in the charge interval, and the inductor current $I_L$ is distributed to the positive/negative output voltages VGH/VGL in the discharge interval. The positive/negative output voltages VGH/VGL in the converter 100 can receive energy EGH and EGL respectively in each switching cycle, and the distributed energy proportions are determined by the first/second error signals $V_{EP}/V_{EN}$.

Specifically, at the beginning of each switching cycle, the converter 100 operates on (charge) path 1 with the first switch $M_1$ and the second switch $M_2$ turned on. The inductor current $I_L$ passes through path 1 until the inductor signal $V_{SUM}$ is higher than the sum signal $V_{comp\_sum}$, which represents the total energy required to meet the positive/negative output voltages VGH/VGL. At this time, the second compare signal $V_{C2}$ will change from low to high, and the converter 100 will enter ($V_{GL}$) path 2 with the first switch $M_1$ turned off and the second switch $M_2$ turned on. Accordingly, the negative output voltage VGL obtains energy EGL through path 2, and the discharge slope is VGL/L (L represents inductance of the inductor L). When the inductor signal $V_{SUM}$ intersects with the first error signal $V_{EP}$, the first compare signal $V_{C1}$ will change from high to low, and then the converter 100 will enter (VGH) path 3 with the first switch $M_1$ turned on and the second switch $M_2$ turned off. Accordingly, the positive output voltage VGH obtains energy EGH through path 3, and the discharge slope is ($V_{IN}$–VGH)/L, thereby completing the energy transfer control switching.

It is noted that the converter 100 of the embodiment does not adopt the active-energy-correction (AEC) technique as traditionally used. Generally speaking, the AEC technique requires an additional pair of extra amplifiers in associated with the pair of the first/second error amplifiers 11A/11B. The inputs of the extra amplifiers are connected to the inputs of associated error amplifiers respectively, but the outputs of the extra amplifiers are connected to the outputs of disassociated error amplifiers respectively. The AEC technique may improve the interactive voltage regulation phenomenon caused by a single load change. However, in some applications such as active-matrix organic light-emitting diode (AMOLED), the load currents usually vary simultaneously (or synchronously) and in the same way (commonly called synchronous load transient), which make the cross-regulation problem in the converter even more serious. As the converter 100 of the embodiment does not adopt the AEC technique, the converter 100 can alleviate the suffering on the output voltages when the load currents change simultaneously and in the same way.

According to one aspect of the embodiment, the converter 100 may include a tunable gain control circuit 16 coupled to receive the first error signal $V_{EP}$ and configured to generate an amplified first error signal with a tunable gain K (i.e., ratio of the amplified first error signal to the first error signal $V_{EP}$), such that the amplified first error signal is equal to $K*V_{EP}$.

It is noted that, if the tunable gain control circuit 16 is not used (i.e., K=1), the synchronous load-drawing interactive voltage regulation will cause uneven distribution of positive and negative (voltage) energy, which will lead to uneven size of the transient state. In order to solve this problem, the tunable gain control circuit 16 with K being not equal to 1 is adopted in the embodiment that makes the total energy demand remain unchanged when the load currents change simultaneously and in the same way, and the distribution of positive and negative (voltage) energy can be changed according to the adjustment of K value, thereby changing the energy ratio obtained by the positive and negative output voltages VGH/VGL. Therefore, the embodiment can adjust the transient voltage by adjusting the K value according to specific application requirements.

Figure 4:
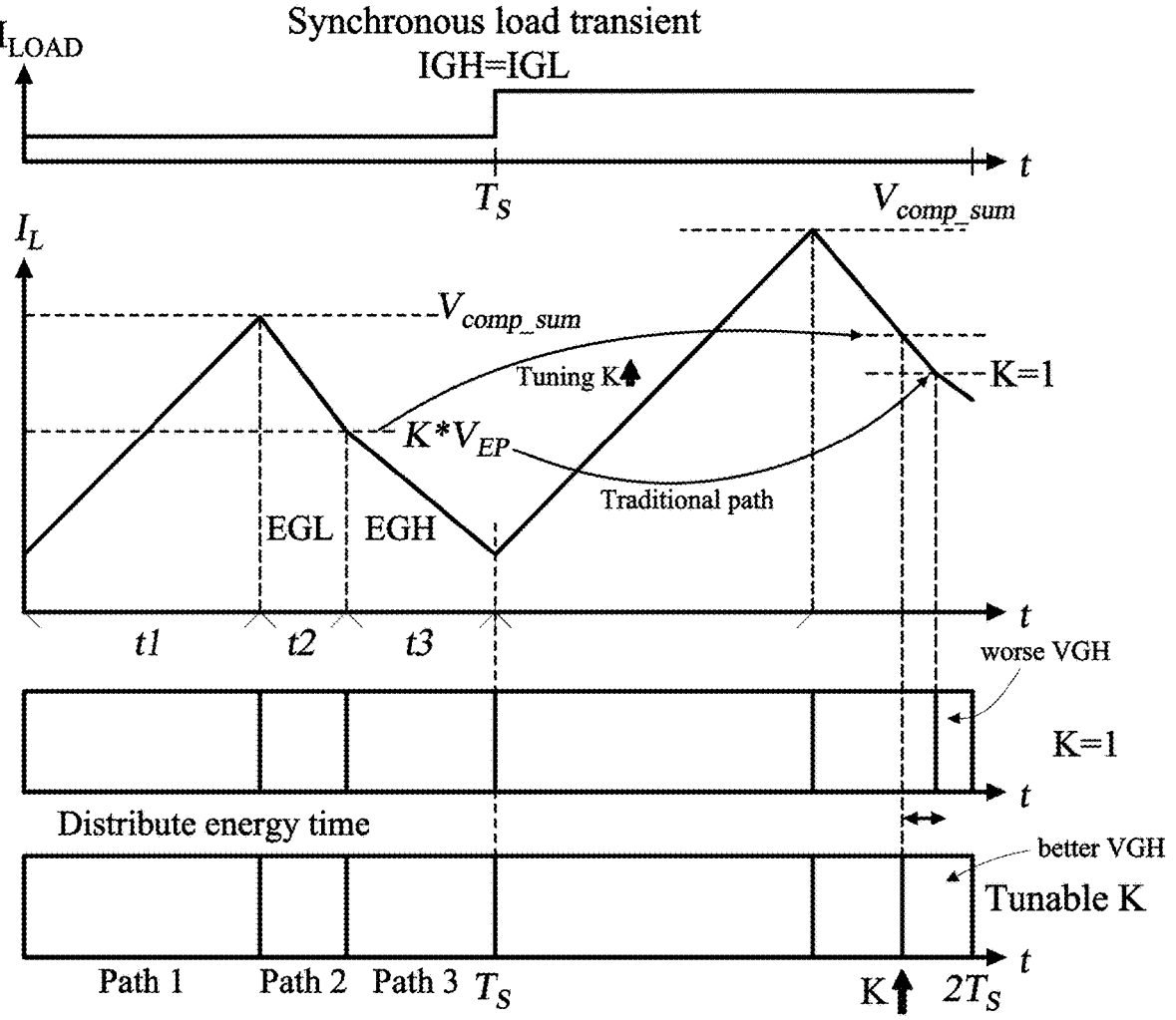
FIG. 4 shows waveforms illustrating energy distribution not adopting the tunable gain control circuit (i.e., K=1) and adopting the tunable gain control circuit with tunable gain K (i.e., K≠1).

FIG. 4 shows waveforms illustrating energy distribution not adopting the tunable gain control circuit 16 (i.e., K=1) and adopting the tunable gain control circuit 16 with tunable gain K (i.e., K≠1). Specifically, at time $T_S$, the load changes from light to heavy with synchronous load transient situation. For example, the load current IGH at the positive output voltage VGH and the load current IGL at the negative output voltage VGL synchronously increase at time $T_S$. At this time, the first error signal $V_{EP}$ and the second error signal $V_{EN}$ will increase to cope with the load change, which will also cause the sum signal $V_{comp\_sum}$ to increase, as shown in the waveform diagram between $T_S$-2 $T_S$. The bottom of FIG. 4 shows the energy distribution time. Without adopting the tunable gain control circuit 16 (i.e., K=1), it can be seen that the time for the negative output voltage VGL to obtain allocated energy after the load changes is much longer than that of the positive output voltage VGH, which will cause the positive output voltage VGH to have a larger transient voltage. By adopting the tunable gain control circuit 16 with tunable gain K (i.e., K≠1), we can control the time when the positive output voltage VGH and the negative output voltage VGL obtain energy whenever the transient occurs, so that we can adjust the energy obtained between the two at the moment of the transient. Taking FIG. 4 as an example, after adjusting the tunable gain K, we can increase the time for the positive output voltage VGH to obtain energy, and relatively reduce the time for the negative output voltage VGL, thereby achieving the effect of a more average transient voltage.

Although specific embodiments have been illustrated and described, it will be appreciated by those skilled in the art that various modifications may be made without departing from the scope of the present invention, which is intended to be limited solely by the appended claims.

What is claimed is:

1. A single-inductor bipolar-output converter, comprising:
a power stage that generates a positive output voltage and a negative output voltage;
a first error amplifier that generates a first error signal according to the positive output voltage;
a second error amplifier that generates a second error signal according to the negative output voltage;
a summation device that generates a sum signal by adding the first error signal and the second error signal;
a tunable gain control circuit coupled to receive the first error signal and configured to amplify the first error signal during a transient to increase time for the positive output voltage to obtain energy, thereby generating an amplified first error signal with a tunable gain;
a first comparator that compares an inductor signal and the amplified first error signal, and outputs a first compare signal indicating whether the inductor signal is larger than the amplified first error signal, the inductor signal representing an inductor current flowing through an inductor of the power stage and slope data of the inductor current with respect to time change; and
a second comparator that compares the inductor signal and the sum signal, and outputs a second compare signal indicating whether the inductor signal is larger than the sum signal;
wherein the power stage comprises:
the inductor;
a first switch controlled by a first switch signal and coupled between an input voltage and a first end of the inductor;
a second switch controlled by a second switch signal and coupled between a second end of the inductor and ground;
a first diode with a cathode electrode connected to the first end of the inductor and an anode electrode at which the negative output voltage is generated; and
a second diode with an anode electrode connected to the second end of the inductor and a cathode electrode at which the positive output voltage is generated;
wherein the inductor current passes through a first path with the first switch and the second switch turned on until the inductor signal is higher than the sum signal, at this time the second compare signal changes from low to high and the inductor current passes through a second path with the first switch turned off and the second switch turned on; and finally, the first compare signal changes from high to low when the inductor signal intersects with the first error signal, and the inductor current passes through a third path with the first switch turned on and the second switch turned off.

2. The converter of claim 1, wherein the first error amplifier amplifies a difference between a predetermined first reference voltage and a first divided voltage that is a fraction of the positive output voltage, the predetermined first reference voltage being connected to a non-inverting input node of the first error amplifier and the first divided voltage being connected to an inverting input node of the first error amplifier.

3. The converter of claim 2, wherein the second error amplifier amplifies a difference between a predetermined second reference voltage and a second divided voltage that is a fraction of the negative output voltage, the predetermined second reference voltage being connected to an inverting input node of the second error amplifier and the second divided voltage being connected to a non-inverting input node of the second error amplifier.

4. The converter of claim 2, wherein the first divided voltage is obtained by a first voltage divider composed of a first resistor and a second resistor connected in series.

5. The converter of claim 3, wherein the second divided voltage is obtained by a second voltage divider composed of a third resistor and a fourth resistor connected in series.

6. The converter of claim 1, wherein the tunable gain is not equal to one.

7. The converter of claim 1, wherein the first error amplifier and the second error amplifier do not include a circuit adopting active-energy-correction technique.

8. The converter of claim 1, further comprising:
a current sensor that generates the inductor signal according to the inductor current flowing through the inductor of the power stage.

9. The converter of claim 1, further comprising:
a path controller that determines one of a plurality of paths on which the inductor current flows and accordingly controls switching of the power stage.

10. The converter of claim 1, wherein the first switch comprises a p-type metal-oxide-semiconductor field-effect transistor with a source coupled to receive the input voltage, a drain connected to the first end of the inductor and a gate coupled to receive the first switch signal.

11. The converter of claim 1, wherein the second switch comprises an n-type metal-oxide-semiconductor field-effect transistor with a source connected to ground, a drain connected to the second end of the inductor and a gate coupled to receive the second switch signal.

12. The converter of claim 1, wherein the negative output voltage obtains energy through the second path, and a corresponding discharge slope is VGL/L, where VGL represent the negative output voltage and L represents inductance of the inductor.

13. The converter of claim 12, wherein the positive output voltage obtains energy through the third path, and a corresponding discharge slope is $(V_{IN}-VGH)/L$, where $V_{IN}$ represents the input voltage and VGH represents the positive output voltage.

14. The converter of claim 13, wherein time for the positive output voltage to obtain energy and time for the negative output voltage to obtain energy are controllably adjusted by tuning the tunable gain.

* * * * *